Aug. 7, 1923.

H. W. MITCHELL

HEATING UNIT

Filed Nov. 12, 1921

INVENTOR
Henry W. Mitchell
BY
Anson Phelps Marr
ATTORNEY

Aug. 7, 1923.

H. W. MITCHELL 1,463,903

HEATING UNIT

Filed Nov. 12, 1921

INVENTOR
Henry W. Mitchell
BY
Arthur Phelps Marr
ATTORNEY

Patented Aug. 7, 1923.

1,463,903

UNITED STATES PATENT OFFICE.

HENRY W. MITCHELL, OF NEW YORK, N. Y.

HEATING UNIT.

Application filed November 12, 1921. Serial No. 514,723.

*To all whom it may concern:*

Be it known that I, HENRY W. MITCHELL, a citizen of the United States, and resident of city of New York, county of New York, State of New York, have invented certain new and useful Improvements in Heating Units, of which the following is the specification.

The device the subject of this invention is a heating unit of almost universal use and while in the drawings I have shown a few uses to which the device may be put from the description and specification which follows it will be realized that the device may operate very efficiently in ways not herein referred to nor described.

The object of the invention is to provide a heating unit that may be utilized directly or in conjunction with other devices and a device wherein the heat generated may be under constant control so that when the device is utilized alone it will not be overheated and damaged, but when utilized with other bodies or devices, the heat may be increased so that other bodies or devices may in turn be heated to any desirable degree.

Another object of the invention is to provide means for preventing the destruction of the device through overheating under any and all conditions and still another object of the invention is to provide means for supporting the device when in use. All of these objects and the means for accomplishing them will be fully set forth as the specification progresses.

The accompanying drawings should be referred to for a complete understanding of the specification which follows.

In the drawings.

Similar reference numerals indicate like parts in all the figures where they appear.

Figure 1:
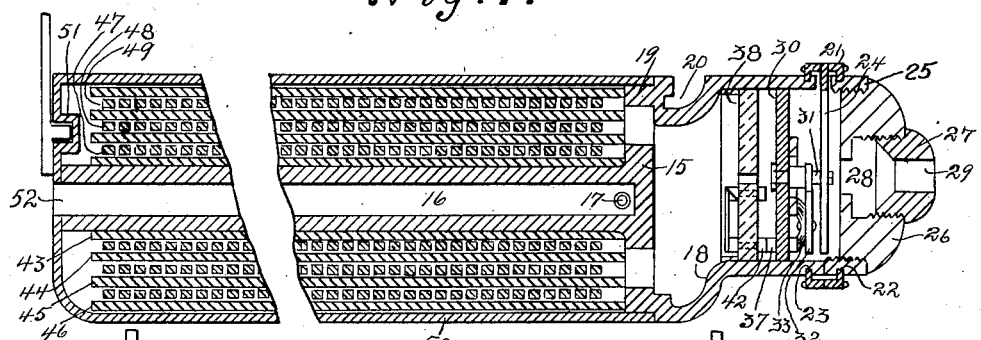
Fig. 1 is a longitudinal sectional view of my heating unit.

Referring to Fig. 1 it will be noted that my device is built up and supported upon a base member which may be of cast iron or any other suitable metal and has formed integral a core member 15 provided with a longitudinal perforation or recess 16 and communicating therewith are transverse recesses 17.

Formed integral with the member 15 is an enlarged extension or casing 18, in which certain mechanisms will be received and retained and it will be noted that the core 15 projects from what may be termed a flange member 19 of the casing 18 and at the upper side of this casing and flange member I provide a recess the function of which will be later referred to.

A rotatable ring 21 is received in recesses 22 and 23 in the casing 18 and operates upon rotation a switch lever 24. The casing 18 may be in two parts having an extension or ring 25 which may be secured to the main body 18 by any suitable means and screwthreaded into the ring 25 is a plug 26 receiving and retaining a second plug 27 and I provide that a space 28 formed partly in each of the plugs 26 and 27 be arranged for the reception of a knot or clamp not shown which will secure the cable or electrical conductor not shown though which will enter through the perforation 29 in the plug 27.

Within the casing 18 is a base plate 30 which supports a switch mechanism, the switch consists of a post 31 rotatable by the lever 24 and to which is secured an arm 32 carrying a laminated contractor 33. This laminated member extends between a common, current carrying member or ring 34 to either of the blocks 35, 36 and 37 closing a circuit between these members.

Another member supported in the extension 18 is the plate 38 of insulating material carrying a plurality of thermostats shown at 39, 40 and 41 and it will be noted that a block 42 from one pole of each thermostat is in mechanical and electrical contact with one of the switch blocks 35, 36 or 37. Each thermostat consists of a plate made up of two different metals in a well understood manner. A slight bowing action of the plate upon application of heat, will open the circuit through the block 41 and as this block is cut diagonally as shown and the thermostats should each be constructed to open at different temperatures, the safe temperature of the section of the winding which they control.

Arranged upon the core member 15 are layers of insulating material 43, 44, 45 and 46 and between these layers of insulating material I arrange spirals or windings of resistance metal as shown at 47, 48 and 49. Each resistance spiral forms an independent element for a purpose that shall appear later and over the outer layer of insulation I place a shell 50 which may be of any suitable metal and which is provided with a recess 51 and a perforation 52, the perforation 52 communicating with the longitudinal passage 16 in the core member 15.

Figure 2:
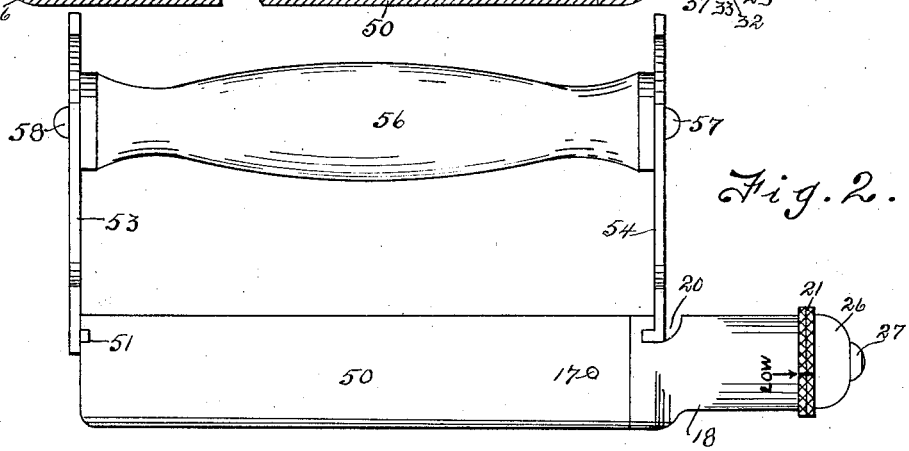
Fig. 2 is a side elevation of the device as used alone, showing one use only.
Figure 3:
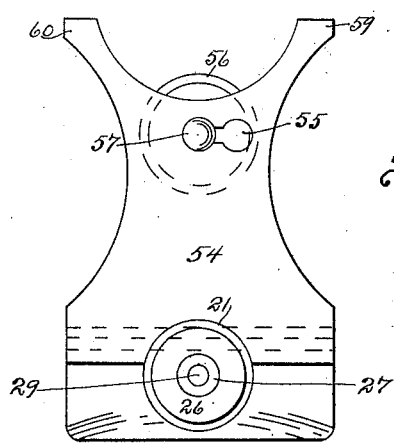
Fig. 3 is an end elevation of the device shown in Fig. 2.

I may provide clamps or bracket members as shown at 53 and 54 one of which is adapted to be received in each of the recesses 20 and 51. These clamp members are provided with key hole perforations as shown at 55 and a handle 56 having projecting pins 57 and 58 is arranged between the members 53 and 54 and when the whole is assembled as shown in Fig. 2 the heating element may be used as a light sad iron. It will be noted that each clamping member is provided with extensions as shown at 59 and 60 and which extend above the handle member 56 and when my device is reversed and the extensions 59 and 60 allowed to rest upon a suitable support my device becomes an efficient stove for heating or for cooking.

Figure 4:
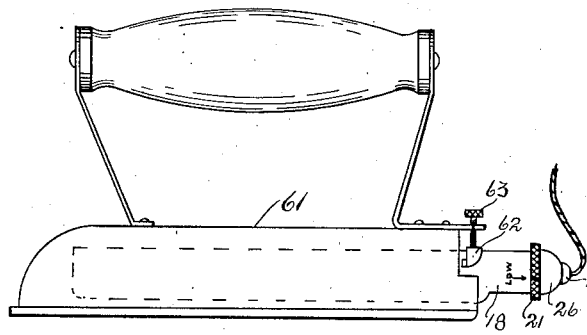
Fig. 4 shows in side elevation the use of my device for heating a sad iron.
Figure 5:
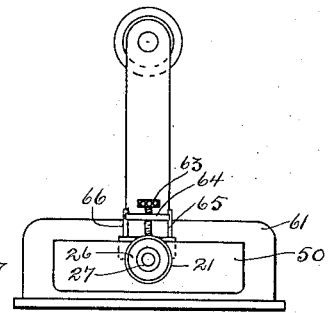
Fig. 5 is an end elevation thereof.

As shown in Fig. 4 my heating element may be employed for heating a sad iron. For this service it is only necessary to provide an iron such as shown at 61 with a suitable recess into which the heating element may be introduced. In the iron shown I also provide means for retaining the heating element in the iron, this means consisting of a block 62 adapted to be retained by a knurled headed screw 63 in the recess 20 and I provide a supporting plate 64 for the screw 63 and guide pins 65 and 66 to prevent the block 62 rotating.

Figure 6:
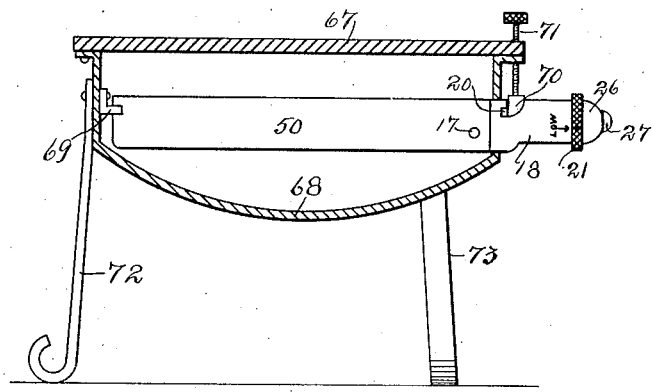
Fig. 6 is a side elevation, partly in section showing my device in use as a heater for a grill or hot plate.

My device may also be employed with a hot plate as shown in Fig. 6 where the plate 67 is supported upon a dished member 68 and my heater is inserted into the dished member the inner end of the heater being received upon a bracket 69 and the outer end being retained by a block 70 and screw 71. The inner side of the dished member should be polished to reflect the heat upward and I may provide legs as shown at 72 and 73 for supporting the members 67 and 68.

Figure 7:
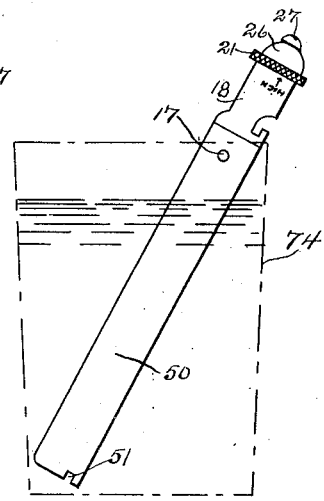
Fig. 7 shows in elevation my device used as a water heater.
Figure 9:
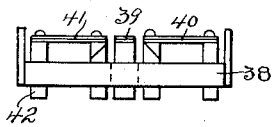
Fig. 9 is a side elevation thereof.
Figures 8, 10:
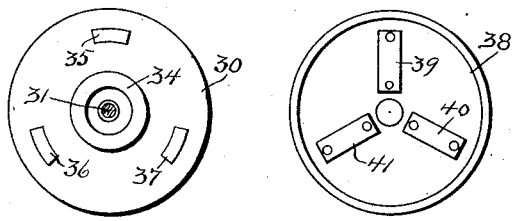
Fig. 8 is a plan view of the thermostats and support.
Fig. 10 is a plan view of the switch plate showing the contact members.

My device may also be used as a water heater and in Fig. 7 I show it so employed and inserted into an ordinary drinking glass or receptacle 74 and when so employed the water may not only surround the cylinder 50 but may also enter the longitudinal recess 16 in the core 15. The perforations 17 allowing the air to pass out of the recess 16 so that the water will enter.

My device may also be used as a curling iron heater the curling iron being introduced into the longitudinal recess 16 in the core 15.

My device may also be employed with a percolator, it only being necessary to arrange a perforated support for the coffee on about the water line shown in Fig. 7 and a cover for the container through which my heater may be passed, the boiling water will then pass upward through the recess 16 and outward through the percolation 17 and other uses for the device may readily be discovered.

Having carefully and fully described my invention what I claim and desire to obtain is as follows:

1. In a heating element a core member, electrical resistance conductors supported by said core member and a casing for said conductors, said casing and said core member each being provided with recesses and a supporting means adapted to be engaged in said recesses.

2. A heating unit having a casing provided with recesses, supporting members received in said recesses and a handle member retaining said supporting members in operable position.

3. A heating unit having a casing provided with recesses, supporting members received in said recesses each said supporting member being provided with a key-hole slot and a handle member having stud pins adapted to engage in said slots for retaining said supporting members in operable position, projections upon said supporting means and extending beyond the grip of the handle and adapted to support said heating unit in a reversed position.

4. A heating unit having a core member, electrical conductors supported thereby, said core member being provided with longitudinal and transverse perforations away from and independent of said electrical conductors and adapted to receive a device to be heated.

Signed New York city, county and State New York this 3rd day of November, 1921.

HENRY W. MITCHELL.